(12) United States Patent
Adoni et al.

(10) Patent No.: US 9,053,508 B2
(45) Date of Patent: Jun. 9, 2015

(54) PERSONALIZED CUSTOMER SHOPPING EXPERIENCE

(71) Applicant: International Business Machines Corporation, Armonk, NY (US)

(72) Inventors: Siddique M. Adoni, Bangalore (IN); Scott Duby, Deerfield, IL (US); Robyn R. Schwartz, Chicago, IL (US); Dhandapani Shanmugam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 13/781,006

(22) Filed: Feb. 28, 2013

(65) Prior Publication Data

US 2014/0201025 A1 Jul. 17, 2014

Related U.S. Application Data

(60) Provisional application No. 61/751,587, filed on Jan. 11, 2013.

(51) Int. Cl.
*G06Q 30/00* (2012.01)
*G06Q 30/06* (2012.01)

(52) U.S. Cl.
CPC .................................. *G06Q 30/0631* (2013.01)

(58) Field of Classification Search
CPC .......... G06Q 30/0269; G06Q 30/0261; G06Q 30/0623; G06Q 30/0639; G06Q 30/0641; G06Q 30/0631
USPC ................................................. 705/26.1, 27.1
See application file for complete search history.

(56) References Cited

U.S. PATENT DOCUMENTS

| 7,309,009 B2 * | 12/2007 | Singer-Harter ............... 235/383 |
| 2002/0178013 A1 | 11/2002 | Hoffman et al. |
| 2011/0093339 A1 * | 4/2011 | Morton ....................... 705/14.58 |

OTHER PUBLICATIONS

"aisle411 Launches Scalable Indoor Geo-Fence Alerts API to Expand In-Store Mobile Search and Navigation Solutions" (Entertainment Close-up. Jan. 2013).*
Perez, "Walgreens Gets Nationwide In-Store Navigation, But Not in Its Own App", aisle411, http://techcrunch.com/2012/07/17/walgreens-gets-nationwide-in-store-navigation-but-not-its-own-app/, Jul. 17, 2012.

* cited by examiner

*Primary Examiner* — Courtney Stopp
(74) *Attorney, Agent, or Firm* — Scully, Scott, Murphy & Presser, P.C.; Daniel P. Morris, Esq.

(57) ABSTRACT

A system and method that improves and enhances the customer's in-store shopping experience. The consumer product of purchase interest or intent to buy expresses (or self-announces via technology) it's match (or fit based on known or understood buying habits, customer taste, tendencies, etc) against the customer preferences during an in-store shopping experience.

16 Claims, 10 Drawing Sheets

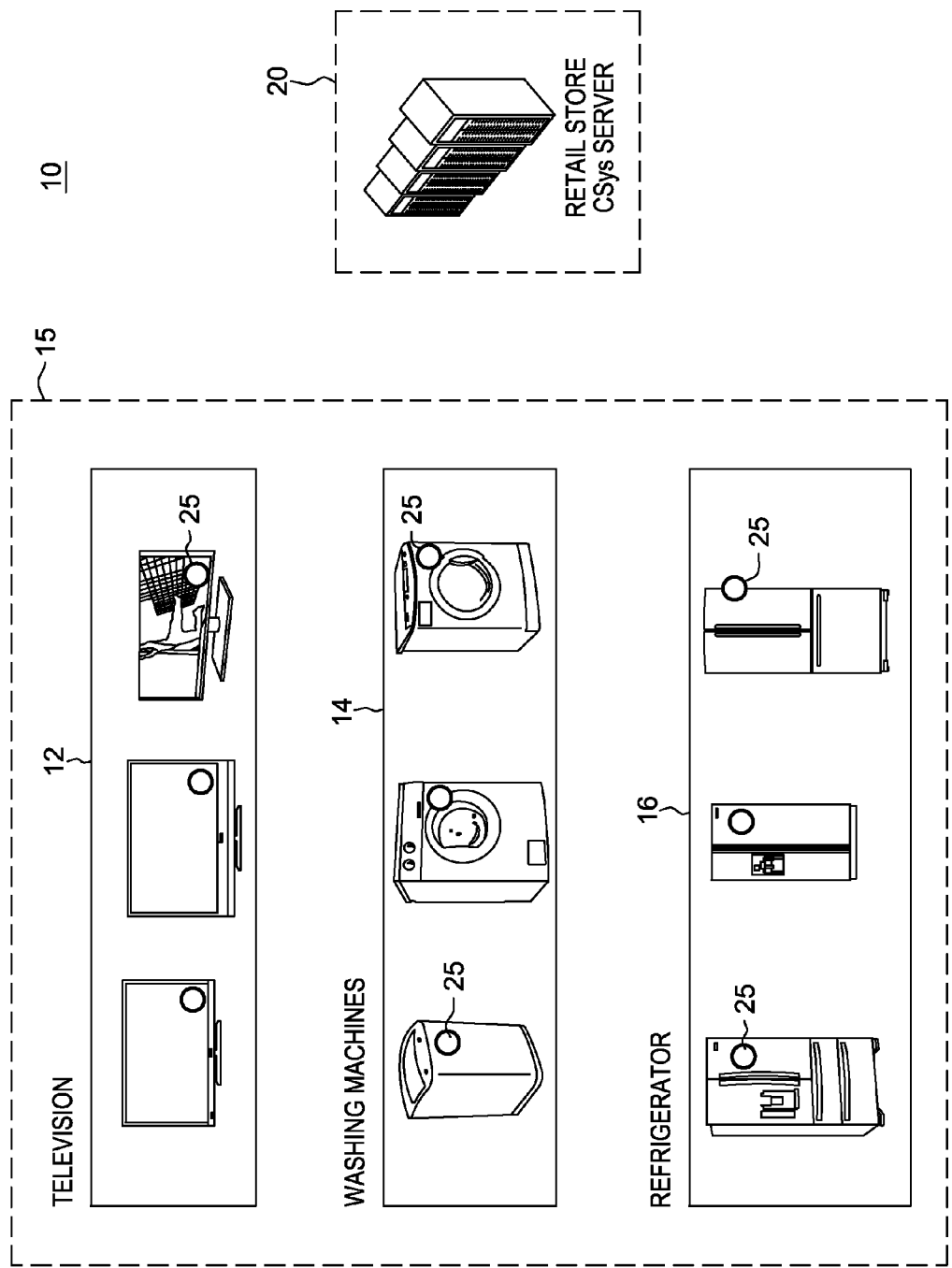

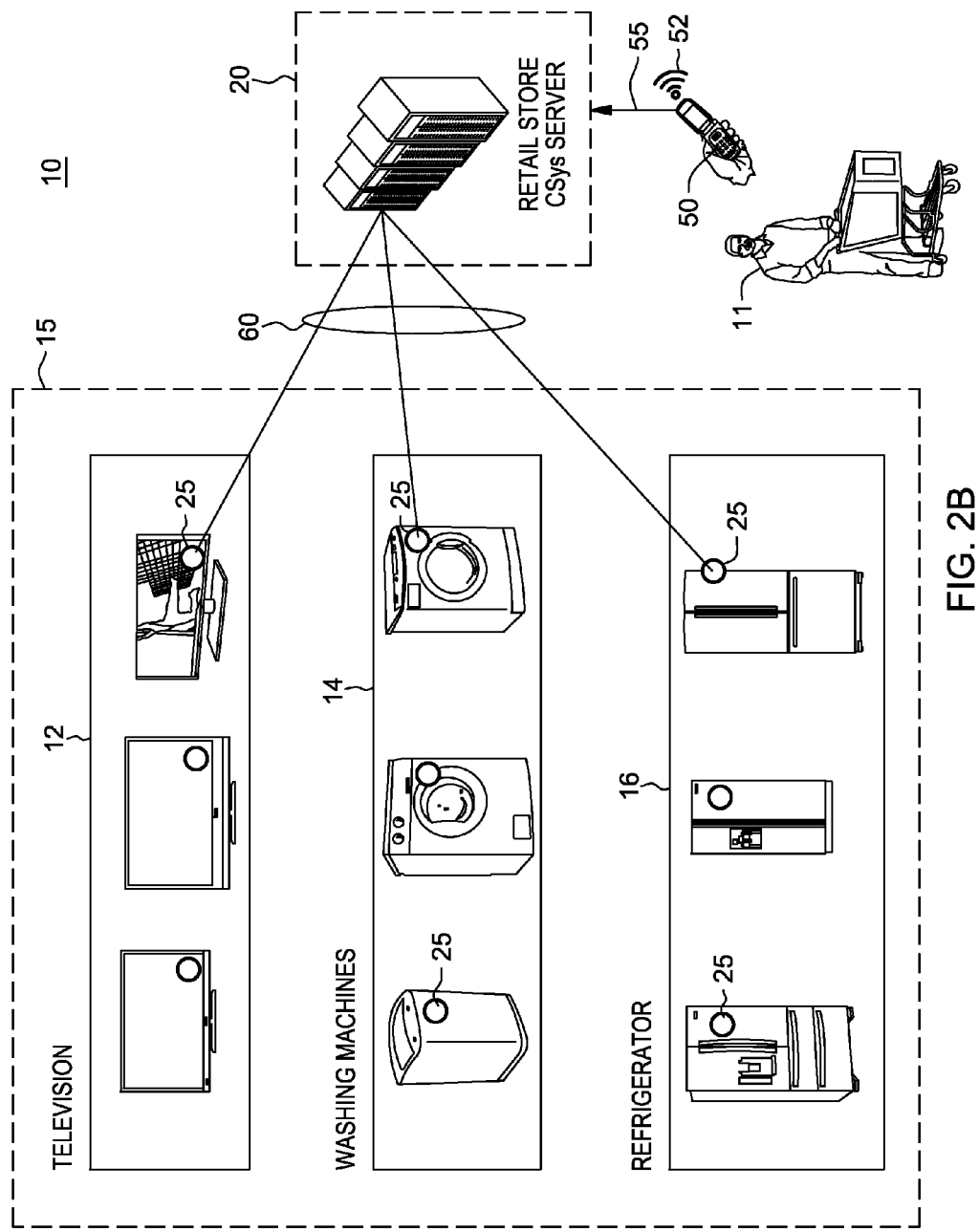

PERSONALIZED CUSTOMER SHOPPING EXPERIENCE

RELATED APPLICATIONS

The present application relates to and claims the benefit of the filing date of U.S. Provisional Patent application Ser. No. 61/751,587 filed Jan. 11, 2013 the entire content and disclosure of which is incorporated by reference as if fully set forth herein.

BACKGROUND

The present disclosure generally relates to methods and apparatuses for providing personalized services, and particularly, a system and method for enabling a personalized customer shopping experience on a temporal basis that matches the inventory on hand at the store with the interested customer.

Generally, in stores such as retail entities, e.g., outlets, department stores, product specialty stores, etc., consumer purchases are categorized into a couple of high level categories including, for example: considered purchases: (i.e., those purchases that occur over time and with less frequency) AND replenishment purchases (i.e., those purchases that occur more often and often with less 'consideration').

Further, it is known that consumers typically leverage several sources of information when making a 'considered' purchase, including: peers, friends/family, critical reviews, etc.

Further, it is known that consumers generally leverage average 2-3 technologies in support of a product research assessment effort.

Further, while shopping in such as retail entities, e.g., outlets, department stores, product specialty stores, etc., consumers more often turn to a store associate or store manager for product item information while in the store.

It would be highly desirable to provide a system and method that automatically provides in-store customer's with a more personalized in-store shopping experience—one matching customers (preferences, segmentation, etc.) with product attributes (static dimensions, applied characteristics, socially derived attributes, availability, etc.).

BRIEF SUMMARY

There is provided, in one aspect, a system, method and computer program product for creating a personalized customer shopping experience on a temporal basis that matches with the inventory of the store on hand.

Thus, as a customer enters a store, the system provides a real time awareness of that customer's purchasing preferences, product buying interests and habits, and propensity modeling about replenishment and these align with the available inventory of the store.

Thus, based on the real-time awareness of the customer's intent and preferences, when in vicinity to the product desired to be purchased, the individual product calls attention to itself in a very personalized and relevant way. The store reconfigures based on the understood or known interests of the customer for that customer's particular in-store shopping trip. That is, the system and method enables a consumer product of purchase interest or intent to buy to express (or self-announce via technology) it's match (or fit based on known or understood buying habits, customer taste, tendencies, etc.) against the customer preferences during an in-store shopping experience.

In one aspect, there is provided a system, method and computer program product for personalizing a customer's in-store shopping experience. The system for personalizing a customer's in-store shopping experience comprises: a memory device; and a programmed processor device for coupling to the memory storage device and configured to: determine, at a store, one or more of a customer's purchasing preferences, tastes and tendencies to purchase products; determine a current consumer's intent to purchase a particular product at the store; determine a match of the current consumer's intended particular product purchase with inventory of products available while the customer is in-store; detect a proximity of the consumer to the available particular product within the store; and once within a threshold vicinity to the particular product, the particular consumer product announces to the customer, a match or fit personalized to the current customer's intent or interest to purchase the particular product.

In a further aspect, there is provided a method for personalizing a customer's in-store shopping experience comprising: determining one or more of a customer's purchasing preferences, tastes and tendencies to purchase products; determining a current consumer's intent to purchase a particular product at the store; determining a match of the current consumer's intended particular product purchase with inventory of products available while the customer is in-store; detecting a proximity of the consumer to the available particular product within the store; and once within a threshold vicinity to the particular product, the particular consumer product announcing, to the customer, a match or fit personalized to the current customer's intent or interest to purchase the particular product and/or related items (e.g., cross-sell, up-sell).

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which:

FIG. 1 depicts one embodiment of a system 10 to provide in-store customer's with a more personalized shopping experience in one embodiment;

FIGS. 2A-2B depict system server and tag functionality providing for the personalized in-store customer shopping experience in one embodiment;

DETAILED DESCRIPTION

Figure 2A:
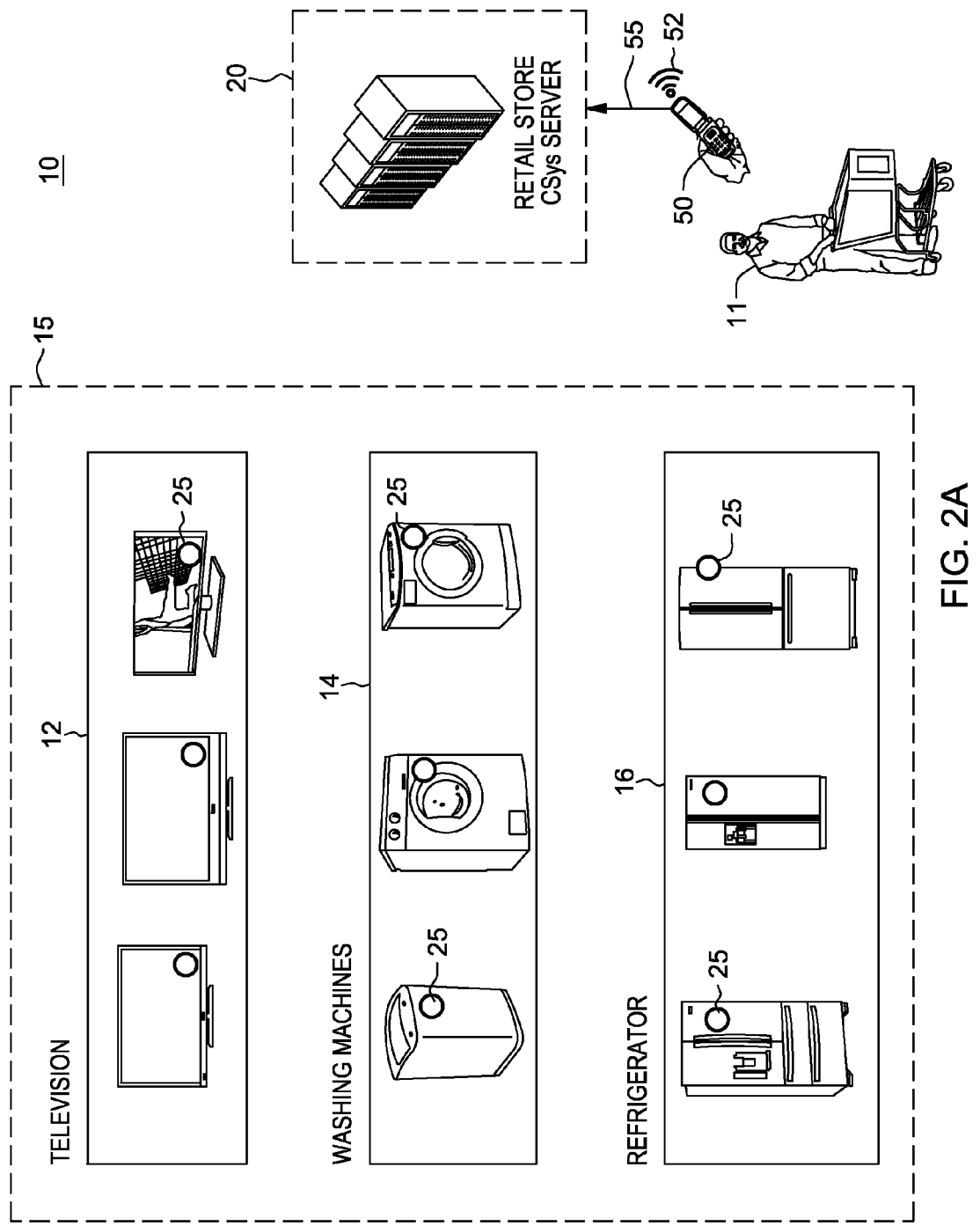

FIG. 1 depicts one embodiment of a system 10 to provide in-store customer's with a more personalized real-time shopping experience in one embodiment.

The system 10 providing in-store customer's with a more personalized shopping experience is shown for illustrative purposes as implemented in a store 15 having associated types of retail products, e.g., an in-store isle or area 12 of televisions, an in-store isle or area 14 washing machines 14, an in-store isle or area 16 of refrigerators, etc., such as may be found in a Best Buy™ retail store. It is understood that the invention is not limited to any particular type of store or product—and the invention is applicable to many types and sizes of stores, e.g., on the order of local "mom and pop" stores having small products to mega-retailers like Wall-Mart™ or Best-Buy™ selling products such as household appliances and related cross sell products and services.

The store 15 further includes an associated centralized system ("Csys") embodied in part by a physical retail server device 20 which may reside in the physical premises of the store whose functionality will be described in greater detail herein below. In one embodiment, the server is part of an in-store communications network, and configured to communicate wirelessly with various modules to effect implementation of the present system and methods.

Further shown physically attached to inventoried items of the store 15 are tags 25, with one tag 25 associated with a product. Each tag 25 is a hardware device mounted on a product (e.g., appliances) to hold data associated with the product and customers/preferences. The tags and server are in communication via a communications technology, e.g., a wired (TCP/IP), or wireless connection (Wi-Fi/Bluetooth/Infrared) communication, or other wireless communications protocols.

FIGS. 2A-2B depict a system 10 implementing server and tag functionality to provide for the personalized in-store customer shopping experience. A corresponding method 200 for personalized in-store customer shopping experience at a retail store is depicted in FIG. 7.

Figure 7:
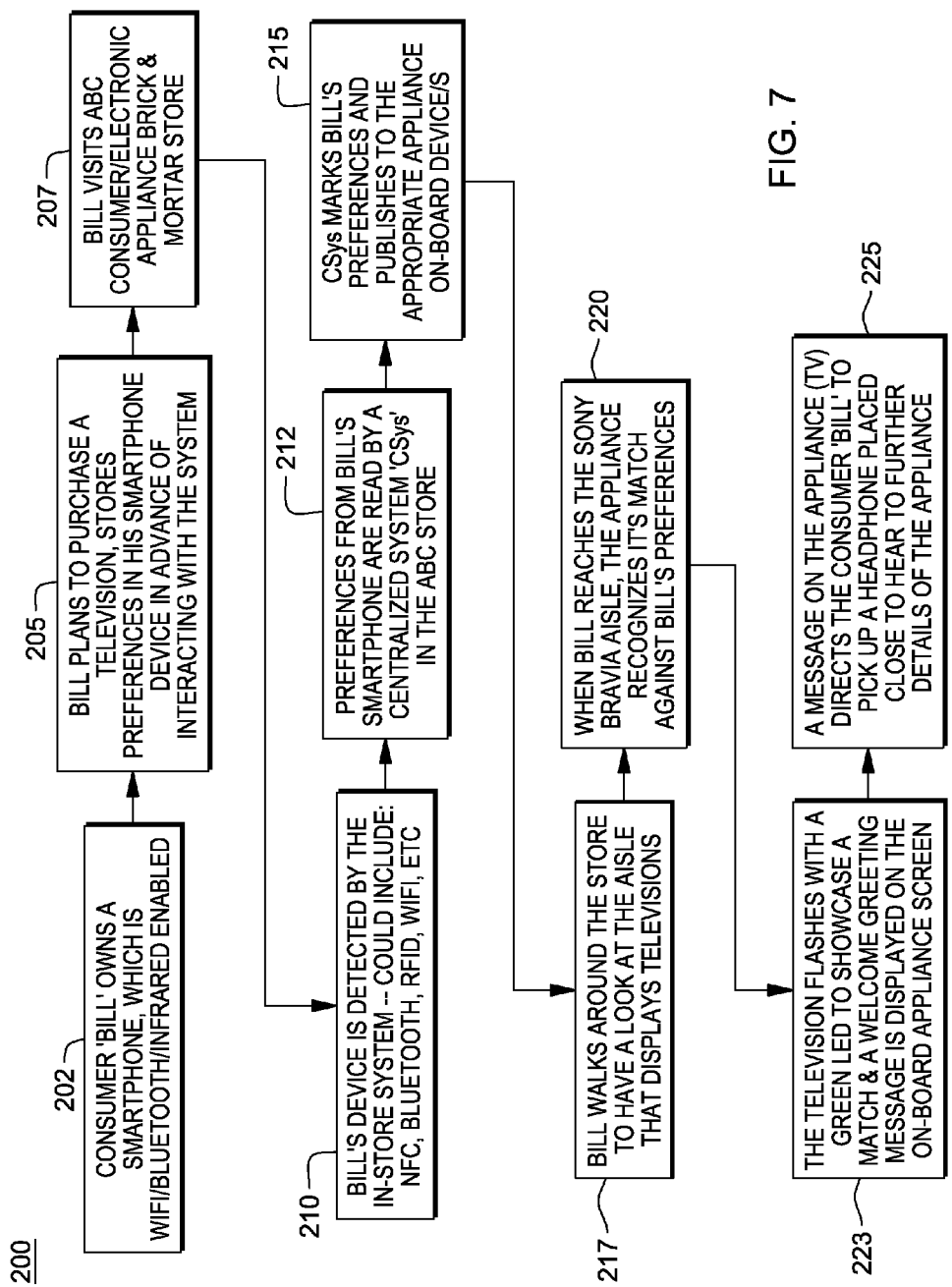
FIG. 7 depicts a method 200 for personalized in-store customer shopping experience at a retail store in one embodiment.
Figure 8:
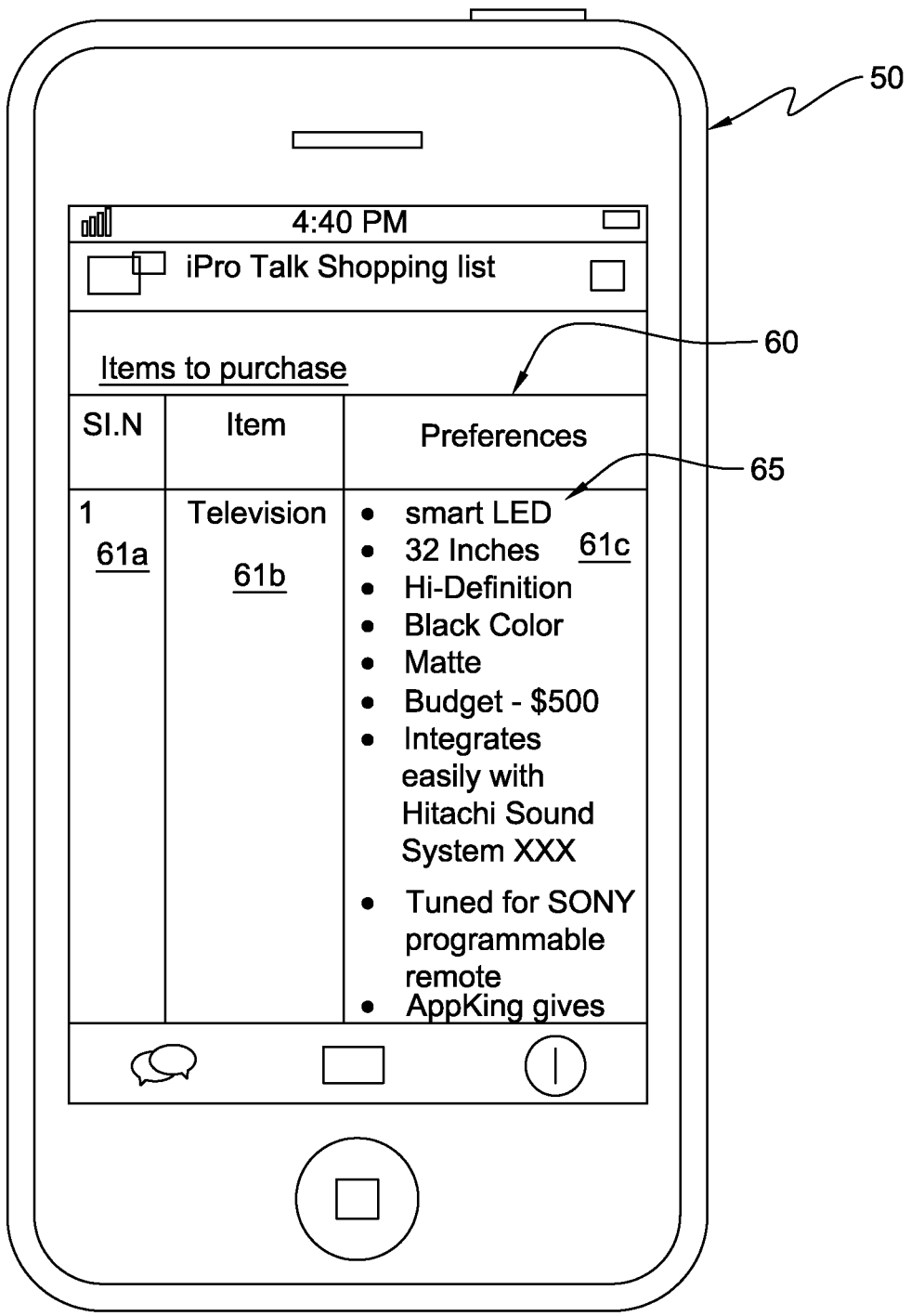
FIG. 8 depicts an example smartphone device 50 programmed with an application providing functionality to generate a user interface 60 via which a consumer may enter product preferences for purchasing a product.

FIG. 7, at 202, reflects a consumer 'Bill' owning a Smartphone, which is WiFi/Bluetooth/infrared enabled. FIG. 7, at 205 depicts a step that the consumer 'Bill' plans to purchase a Television, and prior to entering the store, takes action to manually enter product preferences in his smartphone device in advance of interacting with the system. FIG. 8 depicts an example smartphone device 50 programmed with an application providing functionality to generate a user interface 60 via which a consumer may enter product preferences for purchasing a product, e.g., the Television, at a retail store. In one example embodiment depicted in FIG. 8, the consumer's mobile device interface 60 provides an entry field or area 61*a* for entering a number of products, an entry field or area 61*b* for entering an item type intended to be purchased, and an entry field or area 61*c* for entering customer preference details 65 about the desired product to be purchased.

In one illustrative example, a customer's current in-store purchasing intent (based on the customer's preference list or profile) is to purchase a television (TV) appliance with the following product preferences: it is a Smart LED-type having a 32 Inch screen diagonal with Hi-Definition capability in a Black Color Matte finish all within a budget of $500.

Then, at 207, FIG. 7, the customer, e.g., Bill, visit's an example consumer/electronic appliance brick and mortar store. This is illustrated in FIG. 2A depicting a person, i.e., customer 11 (Bill') first entering the retail store 15.

Via functionality provided in the stores's communications network, at 210, FIG. 7, customer Bill's personal mobile device 50 is detected. That is, the brick and mortar in-store wireless communications network detects the presence of the customer's mobile device 50 via a wireless communications modality including, but not limited to: NFC (near field communication), bluetooth, RFID, WifFi, etc.

Once the in-store Wi-Fi network detects the customer's mobile phone device, it initiates functionality to connect the device to the Wi-Fi hub (via the store's wireless network) over a communications channel that interfaces and otherwise connects with the in-store server 20. As depicted at 212, FIG. 7, preferences from Bill's smartphone device 50 are read by a centralized system implementing the server 20 in the store. For example, in one embodiment, the store, i.e., server 20, obtains the customer's preferences via the customer's mobile device 50 via wireless signals 52 over the network, e.g., via W-Fi, Bluetooth, or some other wireless communications mode, e.g., upon entry and automatic detection of the wireless device to the in-store Wi-Fi network. This data may be automatically pushed to the central in-store server 20 upon entry in the store and detection of and connection with the store's Wi-Fi or wireless hub. In other embodiments, the data of customer's preferences and purchasing intent may be already known to the store (and thus, resident on the server 20) via prior purchasing history, if maintained by that store.

In one embodiment, the information regarding the customer's preference and current purchasing intent (when entering store) is pre-set and/or entered into the mobile device and submitted by the customer to the server 25 upon entry, and the customer has agreed to participate in the store's provision of more personalized shopping experience (e.g., implemented as a business rule).

Thus, in one embodiment, as shown in FIG. 2A, the customer 11 enters the store and the present customer information 55 regarding the customer's current purchase product intent/preferences and/or past product purchasing profile (e.g., prior purchases/habits) is communicated as wireless signals 52 over the Wi-Fi hub or other in-store wireless network for transfer to the central system server 20 of the store.

Continuing at 215, FIG. 7, the system (via server 20 functionality) marks Bill's preferences received from his mobile, and publishes to the appropriate appliance on-board device/s (tags 25). This is further illustrated in FIG. 2B depicting the present customer information 55 regarding the customer's current product purchase intent being transferred, e.g., via wireless network communication signals 60, from the server 20 to each of the corresponding appliances.

In one embodiment, information (data) of the consumer and that consumer's current product purchasing intent are wirelessly "pushed" to hardware devices, i.e., Tags 25, a tag associated with each appliance in the store 15 via any communication mechanisms Wi-Fi/Bluetooth or Wired LAN. The Tags 25 are mounted on the appliance receives and stores the data. More particularly, each respective Tag 25 holds data including, but not limited to: product specifications about the particular product upon which the respective tag 25 is mounted, and details of the interested customer and that customer's current purchasing preferences.

The Tag 25 publishes the content based on the relevant data matched. That is, the server 20 is programmed to run functions and routines that perform a comparison and inventory check, potentially matching, in real-time, customer's current product purchase intent—including product preferences—to current available (i.e., in-store) products. In one embodiment, products and customers are matched based on aligned attributes without regard for derivation of attribute. There is thus performed at the server 20 a level of correlation that first determines what product(s) is available, and how it associates with the current in-store customer. This "association" is parameter based; for example, buying interest, tendencies and habits and propensity for purchasing (an understanding of the broader customer of the customer buying habits and tendencies (not only characteristics and buy behavior) but also matching of the product characteristics (as well as the customer characteristics).

For example, the server may address how relevant is the desired product for a particular consumer preference, and further evaluate how many consumers with similar preferences have chosen this product. The centralized system and server 20 is configured with a mechanism to rank the most preferred and bought consumer appliance for any kind of preference.

This is thus a "product modeling" as opposed to looking at the buying behavior of the end user but also matches the product characteristics. That is, there are understood or fixed attributes that relate to a product that may be derived from the manufacturer, these include but are not limited to: dimensions, specifications, components or parts, ingredients, size, season, etc. There are those gleaned attributes such as those that may be sourced from social web—customers may apply attributes to products, such as but not limited to: "cool", easy to use, durable, fashionable, poor, flimsy, etc. These are more subjective in nature generally. There may be attributes that the retailer applies based on their marketing programs, etc. There are also those attributes that have to do with inventory levels—count, location, condition, etc. There are also attributes that relate to propensity for replenishment—e.g., how long until a product is replaced. There are also attributes based on a customer's profile or segment. These attributes can be categoric or product based and can be temporal in the sense that they are based on a current shopping experience.

Continuing, at 217, FIG. 7, the customer Bill then proceeds to walk around the store to have a look at the aisle 12 that displays televisions. As reflected at 220, FIG. 7, when Bill reaches the Sony Bravia Aisle, the appliance recognizes it's match against customer Bill's preferences.

Figure 3:
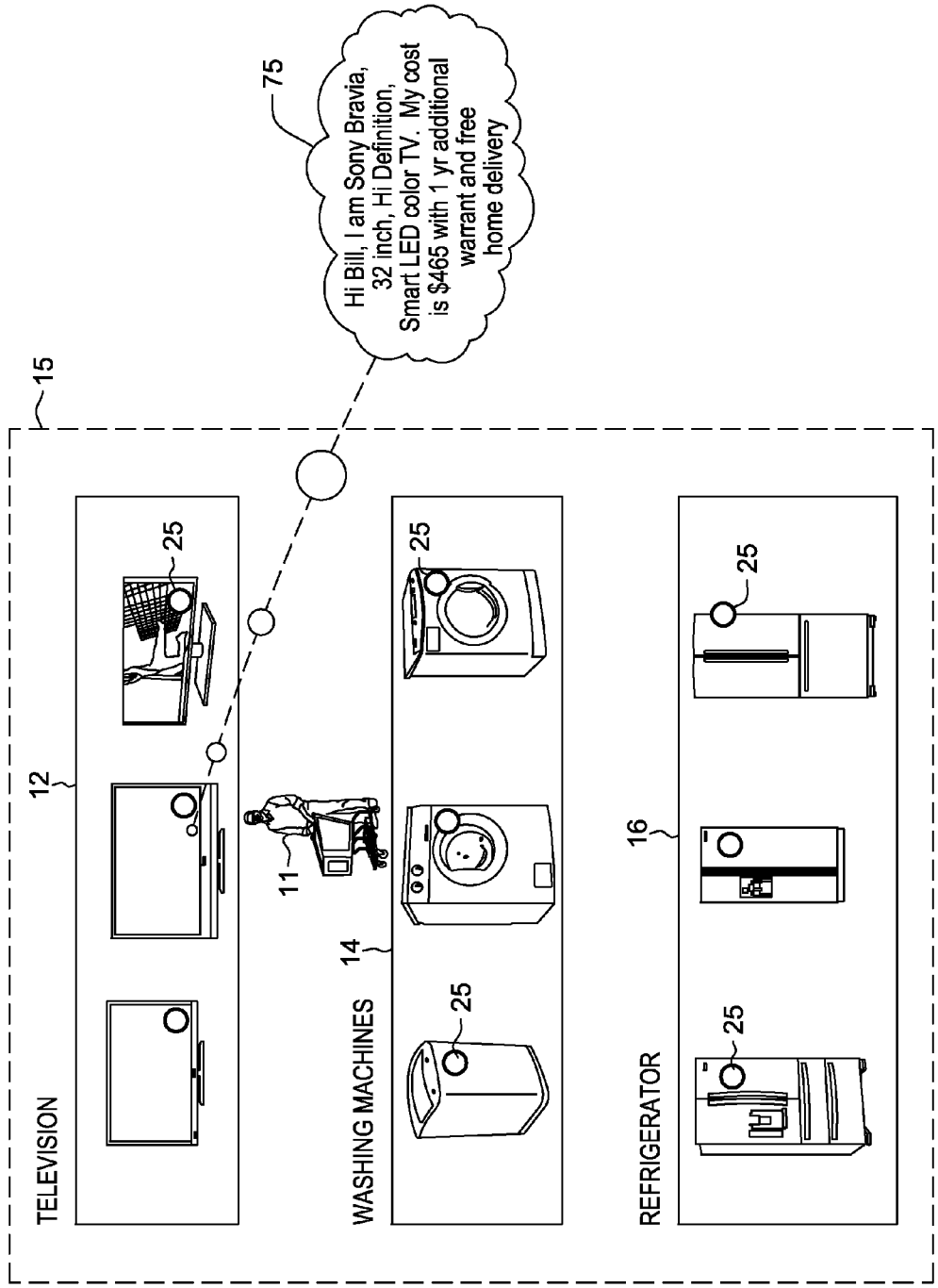
FIG. 3 depicts the in-store announcing to a customer detected in vicinity of a matched product according to one embodiment.

Thus turning to FIG. 3, in one embodiment, once information in TAGs 25 are loaded (e.g., pushed) with content regarding the current customer 11 intended product purchase and product preferences (e.g., a television (TV) appliance with product preferences that it is a Smart LED-type having a 32 Inch screen diagonal with Hi-Definition capability in a Black Color Matte finish all within a budget of $500), the system tracks the customer's location and waits for customer to approach the location where the potential matching products are. For example real time tracking by using the mobile device, each matched product, e.g., TV appliance for the customer 11 in the example depicted, will sense the presence of the customer via the customer's mobile device. This can be achieved by getting user's presence information based on his smartphone device's identity. As the customer 11 approaches the TV isle 12 of the store 15, one particular TV brand, e.g., Sony Bravia 32 inch TV, understands that a consumer 11 with matching specifications is in the vicinity.

Returning to 223, FIG. 7, the 'matched' television product then alerts the user, e.g., flashes with a green LED to showcase a match, and a welcome greeting message is displayed on the on-board appliance screen (when the appliance is so equipped).

For example, the TV product consequently provides a personalized audio message, e.g., an "invitation" to the customer to purchase the product, once the customer location is sensed in the vicinity of the preferred TV product. For the example customer named "Bill" depicted in FIG. 3, an audio message 75 generated by the TAG may include Hi Bill, I am Sony Bravia, 32 Inch, Hi Definition, Smart LED color TV. My cost is $465 with 1 yr additional warrant and free home delivery.

In one embodiment, personalization can include but is not limited to a customer's preferences for language, cost, propensity to purchase, price sensitivities, etc.

In one embodiment, as reflected at 225, FIG. 7, a message on the product, e.g., (TV appliance) may further direct the consumer 'Bill' to pick up a headphone associated with or placed close to the product, to hear further details about the appliance. Generally, for products that do not provide an audio or display interface, the tag mounted on the appliance will communicate the message by means of an external audio connection (headphones/speaker) and/or video (small display screens).

Figure 4:
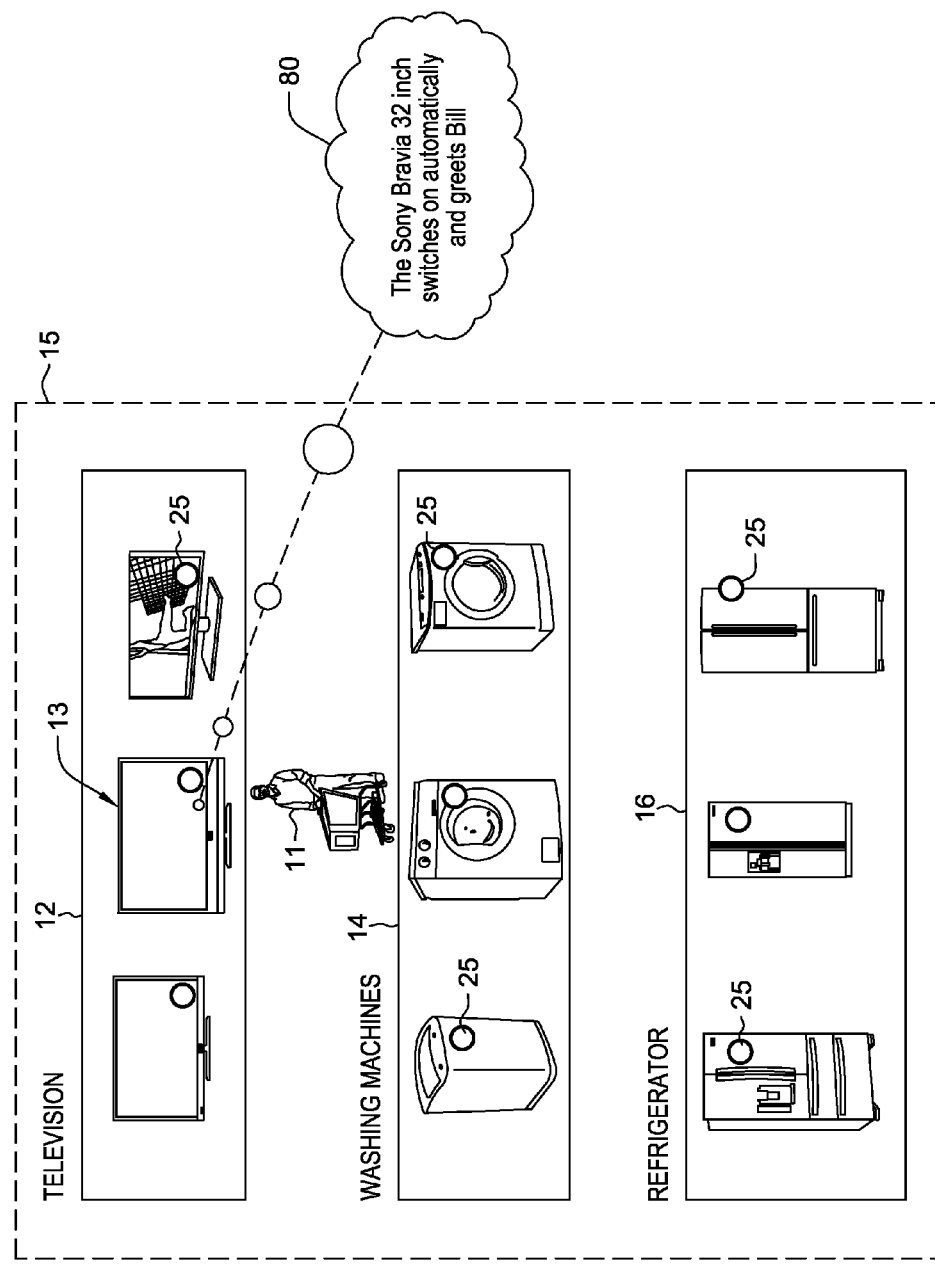
FIG. 4 depicts the in-store announcing to a customer detected in vicinity of a matched product according to an alternate embodiment.

FIG. 4 depicts a further embodiment for personalizing a notification to the customer 11 about the matching product when the customer is in the vicinity of the desired (and matched) product. That is, as shown in FIG. 4, as the customer 11 approaches the TV isle 12 of the store 15, one particular matched TV brand, e.g., Sony Bravia 32 inch TV, understands that a consumer 11 with matching product specification is in the vicinity. The matched TV appliance 13 is provided with functionality, as controlled by the TAG and/or signals received from the server device 20, to automatically switch on to provide a personalized audio/visual (A/V) greeting, e.g., an "invitation" to the customer to purchase the "matched" product, or provide more detail about the product, once the customer location is sensed in the vicinity of the preferred TV product 13. For the example customer named "Bill" depicted in FIG. 4, the Sony Bravia 32 inch TV 13 switches on automatically provides the A/V message 80 greeting "Bill".

In the embodiments of FIGS. 3 and 4 in which based on obtained user product preferences, products are configured to identify themselves when user is in the vicinity, it is understood that the product, or interface associated with the product, may further generate or display: a sequence of lights (e.g., screen emission and/or LED indicators) that respond in an understood sequence to indicate the match of the preferences; or automatically describe itself via A/V means; or offer additional product content based on known, or immediately requested preferences (e.g., content including professional/critical review, peer review, manufacturer descriptions, etc.).

Figure 5:
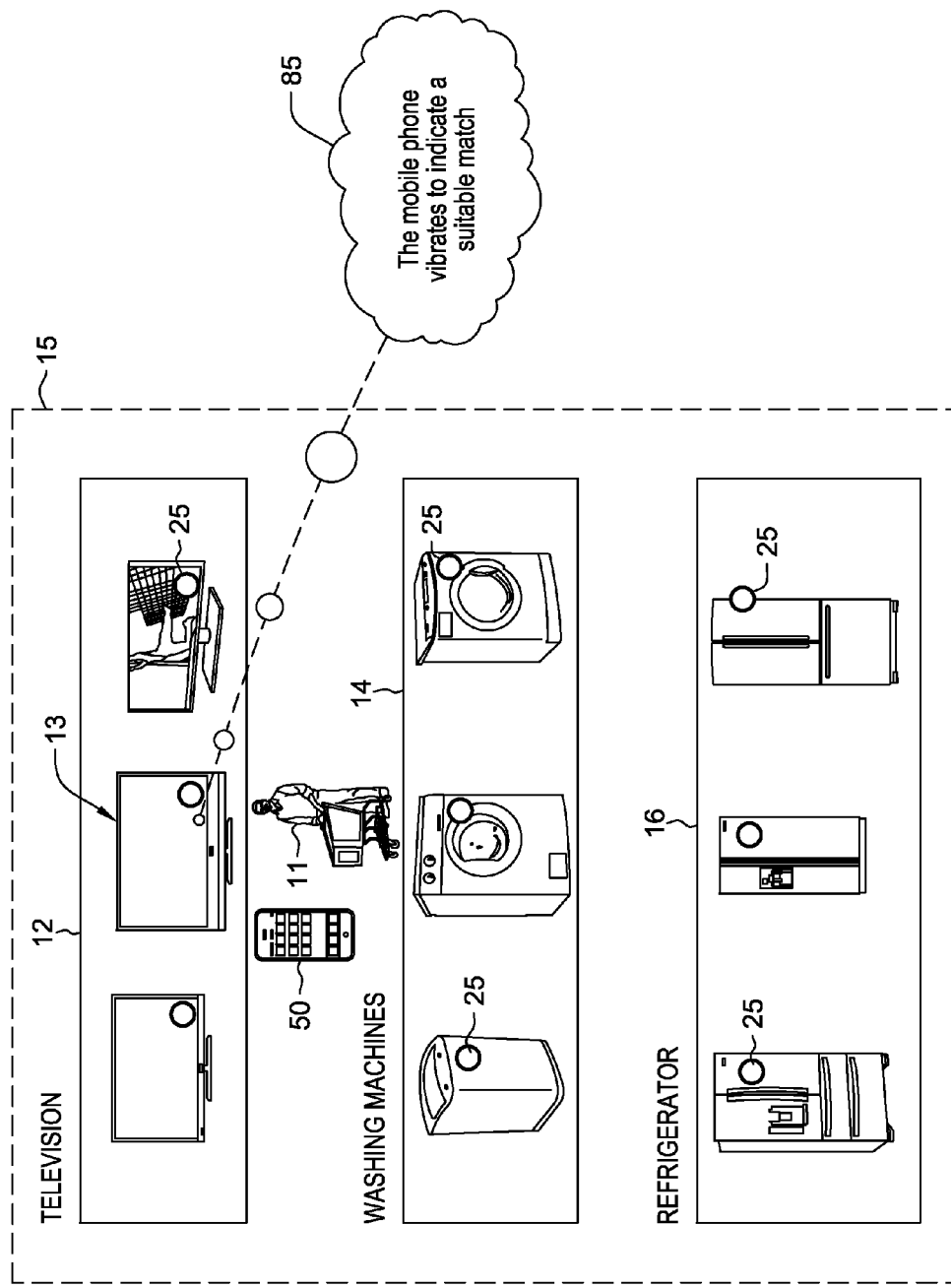
FIG. 5 further depicts the in-store announcing to a customer detected in vicinity of a matched product according to a further alternate embodiment.

FIG. 5 depicts a further embodiment for personalizing a notification to the customer 11 about the matching product when the customer is in the vicinity of the desired (and matched) product. That is, as shown in FIG. 5, as the customer 11 approaches the TV isle 12 of the store 15, the customer's mobile device, e.g., smart phone 50, will provide the indication 85, e.g., by vibrating, to indicate a suitable match.

In this embodiment, the mobile device associated with the customer is configured with an application (for managing the preferences) that includes mechanisms to automatically receive signals from the server device 20, and respond to provide the indication to the customer about the product preferences match by one or more of: a light indication, e.g., via a display screen or LED(s) that blink, a vibration at a specific frequency, playback of an audio ring tone, or a combination thereof.

In view of FIGS. 1-5, it is understood that the server 20, which may be local to the retailer, is programmed to provide the functionality described for receiving/obtaining current customer intent product preferences and pushing this information to the Tag 25. If the application is provided/operated by a third party, then through business relationships, the relevant data can be shared by immediate business rules according to current retailer. The application that stores the characteristics about the person—this data is collected may be shared with the current retailer according to business rules.

Managing allocation of products to stores, is made available to stores inherently, e.g., via inventory management systems. Thus, each retailer (store) has present current knowledge of store products and preferences. These systems enable stores to know what products are available such that the matching functionality may be determined at the server to match the product based on the customer preferences received.

In one embodiment, the server device 20 and services provided by the server and tags 25 for providing personalized in-store shopping experience as shown may be performed by a retailer individually, or by a third party retail service provider.

Thus, for example, when provided by a $3^{rd}$ party service, preferences can be in the form of a list, or like format, which may be shared among many multiple retailers. In this embodiment, any customer preference list may be formatted in a manner so as to be understood by the server device 20 at any retail establishment. That is, a third party (e.g., $3^{rd}$ party service provider) could provide the services described in FIGS. 1-5 for receiving information from the customer and populating the tags with customer preferences, and many retailers will subscribe to the services offered by this 3rd party. In such a scenario, a common mobile device application interface/format is provided in which current customer product and/or list of preferences is entered by a customer (either in-store or prior to entering the store), and which format will be recognized by a third party service provider providing the services described herein at any subscribing retail establishment.

Alternately, each retail outlet may be self-supporting in which case, a current customer's product and/or list of preferences is entered in the form only recognized by one particular retailer, for example, and not conforming to any one standard.

Generally, the present system may include or integrate other 3rd party systems to get users presence, systems to make audio/video announcements, and a software interface to extend the existing legacy retail applications to enable reading in the customer preferences, making announcements, etc.

Figure 6:
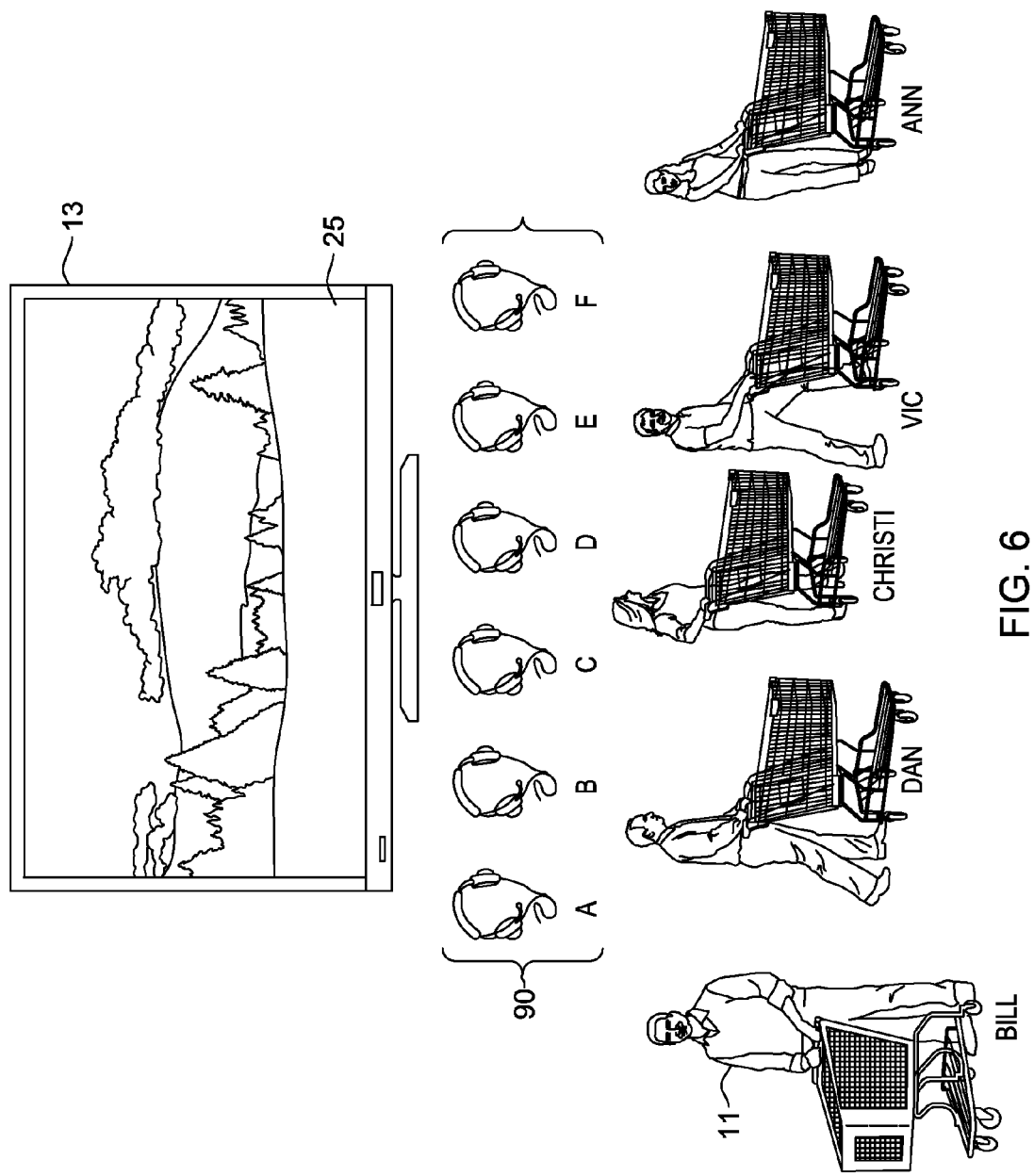
FIG. 6 shows an embodiment of system 10 in which the in-store announcing is provided simultaneously to multiple customers detected as having a like or similarly preferenced product.

Continuing now to FIG. 6, there is depicted a further embodiment of system 10 operation with plural customers each intending to purchase a similar or like customer-preferred products. In the embodiment depicted in FIG. 6, multiple customers, e.g., 5 customers: Bill, Dan, Christi, Vic and Ann are customers who intend to buy a same TV, or have similar preferences for a TV purchase. The centralized system 10 publishes each of the customer preferences to the Tags 25 at each respective TVs as soon as the customers enter the store. For example, the following are the example customer's preferences of the TV, i.e., out of 50 customers inside store, the above listed 5 customers have TV as their item to be purchased with following preferences: 32 Inch, Hi Definition, Smart LED color TV having a cost budget of $465 with 1 yr additional warrant and free home delivery.

Then, continuing in the manner described herein with respect to FIGS. 2A-2B and 4, after server 20 performs matching the current customer's product and product preferences with available in-store products, the product 13 (e.g., appliance), e.g., a Sony Bravia TV, that has matched each of the customers' preference, itself performs the following: 1) the product 13 greets the individual customers Bill, Dan, Christi, Vic and Ann by their names; and, 2) the product 13 asks each of the 5 customers to pick up the earphones 90A, . . . , 90E for the respective customers, so that the customers may get to know more details about the product (e.g., TV 13).

In an alternate embodiment implementing scenario depicted in FIG. 6, the product 13 (e.g., appliance such as a Sony Bravia TV) that has matched each of the customers' preference, alternatively may inform each of the customers to pick up their personal mobile device, e.g., smartphone device 50, and dial a pre-determined number(s) to be informed about more of the TV features.

Figure 9:
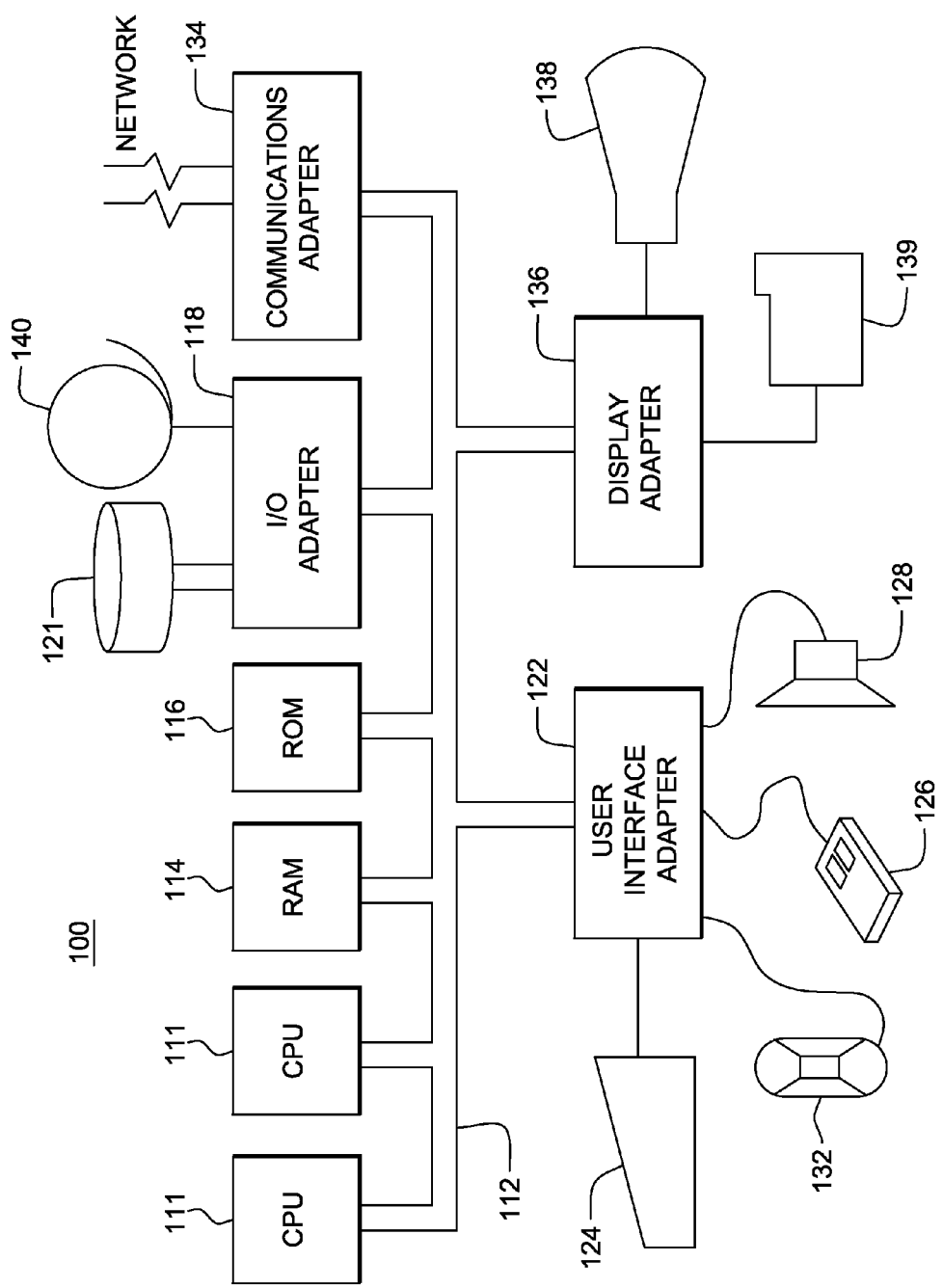
FIG. 9 illustrates one embodiment of a hardware configuration of a computing system 100 corresponding to server 20 in the system 10 of FIG. 1.

FIG. 9 illustrates one embodiment of an exemplary hardware configuration of a computing system 100 programmed to perform the method steps described herein with respect to FIGS. 1-7. The hardware configuration preferably has at least one processor or central processing unit (CPU) 111. The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting the system 100 to a data processing network, the Internet, an Intranet, a local area network (LAN), etc., and a display adapter 136 for connecting the bus 112 to a display device 138 and/or printer 139 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A system for personalizing a customer's in-store shopping experience, the store including a plurality of electronic products for in-store customer purchase, the system comprising:
   a receiver device physically attached to a corresponding electronic product and configured for receiving data over a communications network,
   a memory device;
   a programmed processor device for coupling to said memory storage device and configured to:
      detect, using wireless communications signals, a presence of a mobile phone device associated with a customer in the store;
      determine, from the mobile phone device of the in-store customer, one or more of the in-store customer's purchasing preferences, tastes and tendencies to purchase electronic products;
      determine the in-store customer's intent to purchase a particular electronic product at the store;
      determine a match of the customer's intended particular electronic product purchase with inventory of electronic products available while the customer is in-store;
      communicate information regarding the in-store customer's preferences and a current purchasing intent, over the communications network, for receipt at the receiver device attached to the matched particular electronic product, such that said matched particular electronic product acquires a temporal understanding of the product preferences of the in-store customer;
      use said wireless communications signals to sense and track position of the mobile device associated with the in-store customer and detect a proximity of the in-store customer to the available particular electronic product within said store; and
      responsive to detecting the mobile device associated with the in-store customer is within a threshold vicinity to said particular electronic product, cause, via an interface provided with said particular electronic product, presentation of an alert to said customer, said alert indicating a match or fit personalized to the customer's intent or interest to purchase said particular product.

2. The system of claim 1, wherein the programmed processor device is further configured to:
   determine one or more matched products of the customer's intended particular product purchase with said inventory of products available while the customer is in-store; and organize those one or more "matched" products via a rank presentation order.

3. The system of claim 1, wherein the programmed processor device is further configured to:
   alert, by the system, to the in-store customer of any cross-selling and related items that can announce themselves to a in-store customer based on known or understood relevance to the customer's needs.

4. The system of claim 1, wherein the product performs: informing the in-store customer about the particular electronic product being matched when the customer is in its vicinity.

5. The system of claim 1 wherein to cause a presentation to said customer indicating a match or fit personalized to the current customer's intent or interest to purchase said particular product, the processor device is further configured to:
   automatically initiate switching on said electronic product and automatically providing, via said electronic product, one or more of: an audio message, a visual message, or audio-visual message greeting the in-store customer of the known preferences.

6. The system of claim 1 wherein to cause a presentation to said customer indicating a match or fit personalized to the current customer's intent or interest to purchase said particular electronic product, the processor device is further configured to:
   automatically activate one or a plurality of indicators on said electronic product to respond in a sequence to indicate the match of the known preferences.

7. The system of claim 1 wherein to cause a presentation to said customer indicating a match or fit personalized to the current customer's intent or interest to purchase said particular product, the processor device is further configured to:
   automatically switch on said electronic product and automatically provide, via said provided product interface, one or more of: an audio greeting message, a visual greeting message, or audio-visual greeting message describing itself.

8. The system of claim 1 wherein to cause a presentation to said customer indicating a match or fit personalized to the current customer's intent or interest to purchase said particular electronic product, the processor device is further configured to:
   automatically switch on said electronic product and automatically providing, via said product interface, one or more of: an audio greeting message, a visual greeting message, or audio-visual greeting message describing the product content based on known, or immediately requested preferences.

9. The system of claim 1 wherein to cause a presentation to said customer indicating a match or fit personalized to the current customer's intent or interest to purchase said particular electronic product, the processor device is further configured to:
   automatically activate the mobile device associated with the in-store customer to provide indication via the mobile device to the in-store customer about the match.

10. The system of claim 9, wherein the indication provided to the in-store customer via the mobile device comprises: a light indication, a vibration at a specific frequency, playback of an audio ring tone, or a combination thereof.

11. A computer program product for personalizing a customer's in-store shopping experience, the store including a plurality of electronic products for in-store customer purchase, said computer program product comprising a non-transitory computer readable storage device, said device tangibly embodying a program of instructions executable by the computer for performing a method comprising:
   detecting, using wireless communications signals, a presence of a mobile phone device associated with a customer in the store, the store providing a plurality of electronic products or appliances for in-store customer purchase, each electronic product or appliance having a receiver device physically attached thereto configured for receiving data over a communications network;
   determining from the mobile phone device of the in-store customer, one or more of the in-store customer's purchasing preferences, tastes and tendencies to purchase electronic products or appliances;
   determining the in-store customer's intent to purchase a particular electronic product or appliance at said store;
   determining a match of the customer's intended particular electronic product purchase with inventory of electronic products or appliances available while the customer is in-store;
   communicating information regarding the in-store customer's preferences and a current purchasing intent, over the communications network, for receipt at the receiver device attached to the matched particular electronic product or appliance, such that said matched particular electronic product or appliance acquires a temporal understanding of the product preferences of the in-store customer;
   sensing and tracking, using said wireless communications signals, a position of the mobile device associated with the matched in-store customer;
   detecting a proximity of the in-store customer to the available particular electronic product or appliance within said store; and
   responsive to detecting the mobile device associated with the in-store customer is within a threshold vicinity to said particular electronic product or appliance, causing, via an interface provided with said particular electronic product or appliance, a presentation of an alert to said customer, said alert indicating a match or fit personalized to the customer's intent or interest to purchase said particular electronic product or appliance.

12. The computer program product of claim 11, wherein the method further comprises:
   determining one or more matched products of the in-store customer's intended particular product purchase with said inventory of products available while the customer is in-store; and
   organizing those one or more "matched" products via a rank presentation order.

13. The computer program product of claim 11, further comprising:
   alerting, via the interface provided with said electronic product or appliance, to the in-store customer of any cross-selling and related items that can announce themselves to the in-store customer based on known or understood relevance to the customer's needs.

14. The computer program product of claim 11, wherein the product performs: informing the in-store customer about the particular electronic product or appliance being matched when the customer is in its vicinity.

15. The computer program product of claim 11, wherein the causing the presentation of an alert to said customer comprises:
   automatically switching on said electronic product or appliance and automatically providing, via said electronic product or appliance, one or more of: an audio message, a visual message, or audio-visual message greeting the in-store customer of the known preferences, an audio greeting message, a visual greeting message, or audio-visual greeting message describing the product itself, or an audio-visual greeting message describing the product content based on known, or immediately requested preferences.

16. The computer program product of claim 11, wherein the causing the presentation of an alert to said customer comprises:

automatically activating the mobile device associated with a customer to provide indication to the customer about the match.

\* \* \* \* \*